(12) United States Patent
Malapati et al.

(10) Patent No.: US 7,520,555 B2
(45) Date of Patent: Apr. 21, 2009

(54) ENERGY ABSORBING SEAT ANCHOR RESTRAINT SYSTEM FOR CHILD SAFETY SEATS

(75) Inventors: Reddy Malapati, Ypsilanti, MI (US); Chris O'Connor, Livonia, MI (US); Rodney Simon, Warren, MI (US); Pardeep Kumar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 11/608,715

(22) Filed: Dec. 8, 2006

(65) Prior Publication Data

US 2008/0136204 A1 Jun. 12, 2008

(51) Int. Cl.
*B60N 2/28* (2006.01)

(52) U.S. Cl. .................. 296/68.1; 296/65.03; 296/1.04; 297/253; 297/216.11

(58) Field of Classification Search ............ 296/187.05, 296/68.1, 65.02, 65.03, 63, 1.04, 1.08, 187.03; 297/250.1, 253, 216.11, 470–472, 254; 280/805
See application file for complete search history.

(56) References Cited

U.S. PATENT DOCUMENTS

| | | | | |
|---|---|---|---|---|
| 2,227,717 A * | 1/1941 | Jones | ...................... | 297/302.4 |
| 2,880,815 A * | 4/1959 | Apfelbaum | ................. | 180/270 |
| 3,126,072 A * | 3/1964 | Johansson | .................... | 267/155 |
| 3,198,288 A * | 8/1965 | Presunka | ..................... | 188/377 |
| 3,361,475 A * | 1/1968 | Villiers | ....................... | 297/472 |
| 3,444,962 A * | 5/1969 | Lech | ........................... | 188/371 |
| 3,462,191 A * | 8/1969 | Erneman et al. | ............ | 297/472 |
| 3,482,872 A * | 12/1969 | Chamberlain | ............... | 297/472 |
| 3,547,468 A | 12/1970 | Gluffrida | | |
| 3,804,396 A * | 4/1974 | Seybold | ...................... | 267/166 |
| 4,201,418 A * | 5/1980 | Reidelbach et al. | ......... | 297/474 |
| 4,358,136 A * | 11/1982 | Tsuge et al. | ................ | 280/806 |
| 5,039,168 A * | 8/1991 | Baymak et al. | ............. | 297/471 |
| 5,464,252 A * | 11/1995 | Kanazawa et al. | .......... | 280/805 |
| 5,639,144 A * | 6/1997 | Naujokas | ..................... | 297/238 |
| 5,755,018 A * | 5/1998 | Grolik et al. | .............. | 24/68 SB |
| 6,302,346 B1 * | 10/2001 | Brown et al. | ............. | 242/379.1 |
| 6,312,057 B1 * | 11/2001 | Feile | ........................... | 297/471 |
| 6,485,055 B1 | 11/2002 | Swayne et al. | | |
| 6,517,154 B2 | 2/2003 | Sawamoto | | |

(Continued)

FOREIGN PATENT DOCUMENTS

EP 0927659 7/1999

*Primary Examiner*—Jason S Morrow
(74) *Attorney, Agent, or Firm*—Fredrick Owens; Alleman Hall McCoy Russell & Tuttle LLP (57) ABSTRACT

An energy-absorbing deformable structure to attach a child seat to a mounting portion of a vehicle is provided. The energy-absorbing deformable structure comprises a loop of metal rod including a base end configured to be coupled to the mounting portion of the vehicle, a distal end configured to be coupled to a child safety seat, and a plurality of sinuous deformable portions positioned intermediate to the base end and the distal end, wherein each of the sinuous deformable portions includes an inwardly extending portion that extends inward from a perimeter of the deformable structure to a substantially central interior region of the deformable structure; wherein the sinuous deformable portions of the deformable structure are configured to be deformed when the base end and distal end are pulled in tension, thereby absorbing energy.

18 Claims, 4 Drawing Sheets

U.S. PATENT DOCUMENTS

| | | | |
|---|---|---|---|
| 6,767,057 B2 * | 7/2004 | Neelis | 297/253 |
| 6,969,088 B2 * | 11/2005 | Wang | 280/802 |
| 2005/0217608 A1 | 10/2005 | Johnson et al. | |
| 2006/0049622 A1 | 3/2006 | Yamamoto | |
| 2007/0046014 A1 * | 3/2007 | Glover et al. | 280/805 |

* cited by examiner

FIG. 5

ENERGY ABSORBING SEAT ANCHOR RESTRAINT SYSTEM FOR CHILD SAFETY SEATS

FIELD OF INVENTION

The present application relates to an energy absorbing seat anchor restraint system for child seats.

BACKGROUND

To meet Federal Motor Vehicle Safety Standards, a vehicle may include an upper anchor attachment to receive a child safety seat tether hook connected to an upper portion of the child safety seat back. The connection of the upper portion of the child safety seat to the vehicle may reduce the forward movement of the child safety seat during a frontal crash. However, the shock applied by child safety seat restraining equipment to the child safety seat occupant may increase in case of a forward vehicle collision.

One approach to reduce the impact of the collision force to the child safety seat is described in the U.S. Pat. No. 6,767,057. In particular, anchor attachments to the child safety seat with energy absorbing mechanism are disclosed. In one example, the upper anchorage assembly includes a steel U-shaped bracket with a first end secured to the vehicle horizontally and a second end having a latchable portion for releasable engagement with the corresponding upper child seat latch. If the predetermined forward force is exceeded, the U-shaped bracket bends forward and is deformed. The deformation of the bracket absorbs energy. In another example for a lower anchorage assembly, the U.S. Pat. No. 6,767,057 discloses a C-shaped steel bracket with two legs having corrugated pleats and a through-hole at the free end. A steel anchor post extends between the two legs of the attachment bracket through the through-holes and is welded to the bracket. If the predetermined extension force on the pleats is exceeded, the pleats are straightened. As the metal yields and straightens each pleat, energy is absorbed.

However, the inventors herein have recognized disadvantages with such energy absorbing devices. For example, the ability of absorbing energy of the above devices can be limited by the length of the U-shaped plate and the corrugated pleats, which in turn can be restricted by the available space for the anchor attachment. Further, since one end of the anchorage assembly is fixed to the vehicle and the deformation occurs mainly in one direction, the devices may reduce the impact force in this direction while the reduction on the impact force in another direction may be limited. Furthermore, the disclosed upper anchorage assembly may be observed to be obtrusive in appearance due to its shapes.

SUMMARY OF THE INVENTION

In one approach, the above issues may be addressed by an energy-absorbing deformable structure to attach a child seat to a mounting portion of a vehicle, comprising: a loop of metal rod including a base end configured to be coupled to the mounting portion of the vehicle, a distal end configured to be coupled to a child safety seat, and a plurality of sinuous deformable portions positioned intermediate to the base end and the distal end, wherein each of the sinuous deformable portions includes an inwardly extending portion that extends inward from a perimeter of the deformable structure to a substantially central interior region of the deformable structure; wherein the sinuous deformable portions of the deformable structure are configured to be deformed when the base end and distal end are pulled in tension, thereby absorbing energy.

According to another aspect, an attachment assembly for securing a child safety seat to a vehicle is provided. The attachment assembly comprises a tab coupled to a vehicle mounting portion on a chassis of the vehicle; a deformable structure rotatably hinged to the tab, the deformable structure being formed of a loop of metal rod, wherein the loop includes a base end configured to be coupled to the vehicle mounting portion, a distal end configured to be coupled to the child safety seat, and sinuous deformable portions positioned intermediate the base end and the distal end and extending into a substantially central interior region of the deformable structure, wherein the sinuous deformable portions of the deformable structure are configured to be deformed when the base end and distal end are pulled in tension, thereby absorbing energy.

According to yet another aspect, an energy-absorbing deformable structure for securing a child safety seat to a vehicle is provided. The deformable structure comprises a metal wire coupled to the child safety seat and to a vehicle mounting portion of the vehicle, wherein the metal wire is formed to fit within a space having a predefined perimeter, and curves inwardly on itself from the perimeter in at least one location so that the circumference of the loop of metal wire is longer than the length of the perimeter.

In this way, since the sinuous deformation portions can be varied in the interior loop during the manufacturing process, the deformable structure can be adjusted to achieve a substantially constant load for a desired length of deformation without increasing the size of the deformable structure. Further, the coupling between one end of the deformation structure and the tab enables lateral and rotational movements of the deformation structure. Thus, the attachment assembly can be aligned to absorb or reduce impact forces from different directions. Further, since the deformable structure may include one piece, it may be easy to manufacture. Furthermore, the attachment assembly may be compact and substantially planar. Thus, it may be easier to be disposed in the vehicle or it can be designed to be at least partially hidden from view of to the customers, which improves the aesthetic appearance.

DETAILED DESCRIPTION OF THE PREFERRED EMBODIMENTS

Figure 1:
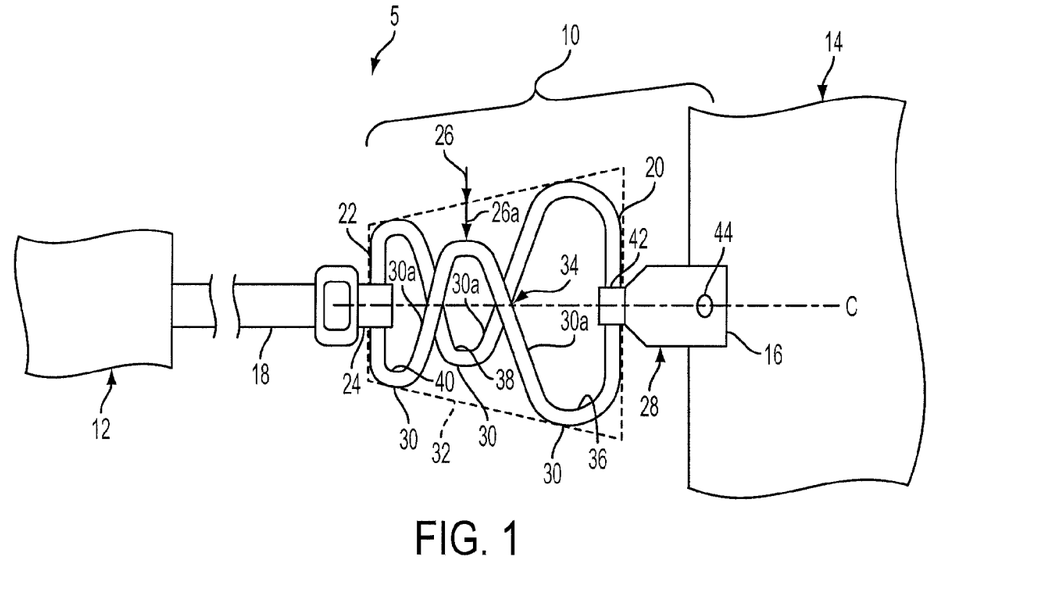
FIG. 1 is a plan view of an exemplary embodiment of an attachment assembly for securing a child safety seat to a vehicle, schematically illustrating attachment to a mounting portion on a chassis of the vehicle and coupling with a tether of the child safety seat.

FIG. 1 is a plan view of an exemplary embodiment of a child seat restraint system 5 including an attachment assembly 10 for securing a child safety seat 12 to a chassis 14 of a vehicle (not shown). FIG. 1 schematically illustrates attachment of attachment assembly 10 to a mounting portion 16 on the chassis of vehicle 14 and coupling of attachment assembly 10 with a tether 18 to child safety seat 12. A base end 20 of the attachment assembly 10 is coupled to mounting portion 16 of vehicle 14 to form an anchorage for child safety seat 12. A distal end 22 of attachment assembly 10 may be coupled to a connector 24 of the tether 18 of child safety seat 12, to thereby secure the child safety seat to the vehicle mounting portion.

For example, attachment assembly 10 may include an energy absorbing deformable structure 26 configured to absorb energy during deformation. When a sufficient force, such as a tensile force due to vehicle impact is applied to attachment assembly 10 through tether 18 and the vehicle mounting portion 16, deformable structure 26 is configured to deform, such that its overall length extends, thereby absorbing kinetic energy through plastic deformation of deformable structure 26, thereby reducing the force on the child safety seat.

In some embodiments, the base end of the attachment assembly 10 may be coupled to mounting portion 16 of vehicle 14 by a tab 28. Typically, tab 28 is rotatably coupled to deformable structure 26. Further, tab 28 may be configured to laterally move relative to the deformable structure. This rotational and/or lateral movement increases the freedom of movement of the attachment assembly, thereby easing installation and mounting of the attachment assembly within the vehicle and enabling the deformable structure to more easily align in the direction of tensile force. Alternatively, the tab may be attached in a manner that does not rotate or move laterally.

In some embodiments, child seat restraint system 5 may employ attachment assembly 10 and mounting portion 16 as an upper anchorage for an upper tether of child safety seat 12. In these embodiments, attachment assembly 10 may be mounted at various locations in the vehicle, as described in detail below.

In some embodiments, child seat restraint system 5 may employ attachment assembly 10 and mounting portion 16 as a lower anchorage for one or more lower tethers (not shown) of child safety seat 12. In these embodiments, attachment assembly 10 may be mounted at one or more locations on a passenger seat in the vehicle, such as in the bight of the passenger seat. In such embodiments the mounting portion 16 may be a LATCH (Lower Anchors and Tethers for Children) attachment.

Deformable structure 26 may include one or more sinuous deformable portions 30 positioned in a region within a space defined by a perimeter 32 of the deformable structure. Deformable structure 26 may be made of any suitable deformable material such as metal that may be deformed or displaced for a predetermined distance under a predetermined force. For example, a metal such as steel may be used. During normal vehicle travel, the deformable structure is sufficiently rigid to maintain the child safety seat in a desired position. If a predetermined force on the attachment assembly is exceeded, sinuous deformable portions 30 may be deformed by the force, thereby absorbing kinetic energy.

Typically, the deformable structure is formed to be symmetric relative to a longitudinal axis C, such that the sinuous deformable portions are mirror images of each other. It will be appreciated that other configurations that are non-symmetric, may also be utilized.

In some embodiments, deformable structure 26 may be formed of a loop 26a of metal rod or metal wire, which may be bent to form a plurality of sinuous deformable portions 30 along the loop.

Sinuous deformable portions 30 may include an inwardly extending portion 30a that extends inward from perimeter 32 of deformable structure 26 to a substantially central region of deformable structure 26. Typically, the perimeter 32 is a rectilinear perimeter drawn from the corners of the base and distal ends, as shown in dashed lines in FIG. 1.

In the depicted embodiment, the inwardly extending portion 30a of the sinuous deformable portions 30 extends inward from a location adjacent the perimeter 32 to a location adjacent the central longitudinal axis C of the deformable structure.

In the depicted embodiment, the inwardly extending portion 30a of the sinuous deformable portions 30 of the deformable structure 26 may extend inward from the perimeter 32 to cross over central longitudinal axis C of the deformable structure.

In addition to the deformable portions 30 crossing over central longitudinal axis C, loop 26a may cross itself in one or more crossing regions 34 to separate the loop into a plurality of rings. In the depicted embodiment, the loop crosses itself at the same location where the inwardly extending portions 30a of deformable portions 30 cross over central longitudinal axis C. The loop is formed, as viewed from above, in the shape of a plurality of rings, including a base ring 36 (on which is formed base end 20), an intermediate ring 38, and a distal ring 40 (on which is formed distal end 22). In the embodiment depicted in FIG. 1, the circumference of intermediate ring 38 is smaller than the circumference of both of base ring 36 and distal ring 40. In this embodiment, the circumference of base ring 36 is the largest of the three rings. As discussed further below, the sizes of the rings may vary. For example, in the embodiment of FIG. 1, the intermediate ring is smaller than the distal ring, while in the embodiment of FIG. 2, the intermediate ring is larger than the distal ring.

The perimeter of the deformable structure may be designed to fit within a predefined area, for example a square of approximately 80×80 mm. It should be appreciated that the deformable structure may be fit into other areas of suitable size. For upper anchorage installations, the diameter of the metal wire or rod may range from about 5 mm to 7 mm for the upper anchorage of the child safety seat. For lower anchorage installations, the diameter of the metal wire or rod may be about 6+/−0.1 mm. However, it should be appreciated that other suitable diameters may be used. While typically, a metal wire or rod is used, alternatively another fabrication of metal is used, such as machined, cast, forged, or stamped metal may be used. Further, cross-sections other than circular may be employed, such as rectangular, square or semi-circular.

Tab 28 typically includes deformable structure coupling portion 42 and fastening structure 44. Deformable structure coupling portion 42 may be configured to be a loop receiving opening which is an integral part of the tab. The width of portion 42 may be an important parameter in controlling the design load of deformable structure 26. Typically, the width of portion 42 is between about 25% and 90% of the width of base end 20. In some embodiments, the width of portion 42 may preferably be between about 25% and 70% of the width of base end 20, and more preferably about 25% and 40% of base end 20. When a predetermined force is exceeded, portions of base end 20 may be rotated or moved laterally inside the receiving opening, as described above. Fastening structure 44 may be a rivet, screw, or other suitable mechanisms that couple attachment assembly 10 to the vehicle portion.

Figure 2:
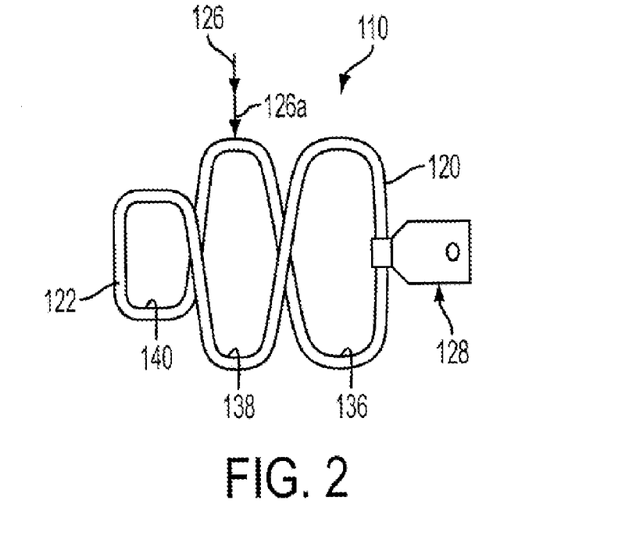
FIG. 2 is a plan view of a second exemplary embodiment of an attachment assembly for securing a child safety seat to a vehicle.

It should be appreciated that various alternatives exist for the attachment assembly shown in FIG. 1. For example, relative sizes and shapes of each ring and number of rings in the loop may vary. FIG. 2 is a plan view of a second embodiment of an exemplary attachment assembly. Attachment assembly 110 is similar to the embodiment shown in FIG. 1 except for the relative sizes of the rings formed in the loop. Like parts in the embodiment of FIG. 2 are numbered similarly to the embodiment of FIG. 1, and only differences will be described for the sake of brevity. In the depicted embodiment, the circumference of distal ring 140 is smaller than the circumferences of intermediate ring 138 and base ring 136.

In this embodiment, perimeter of the deformable structure may be designed to fit within a predefined area, for example a square of approximately 80×80 mm. It should be appreciated that the deformable structure may be fit into other area of suitable size. For upper anchorage installations, the diameter of the metal wire or rod may range from about 5 mm to 7 mm. For lower anchorage installations, the diameter of the metal wire or rod of the child safety seat may be about 6+/−0.1 mm. However, it should be appreciated that other suitable diameters may be used. While in some embodiments, a metal wire or rod may be used, alternatively another fabrication of metal may be used, such as machined, cast, forged, or stamped metal may be used. Further, cross-sections other than circular may be employed, such as rectangular, square or semi-circular.

Figure 3:
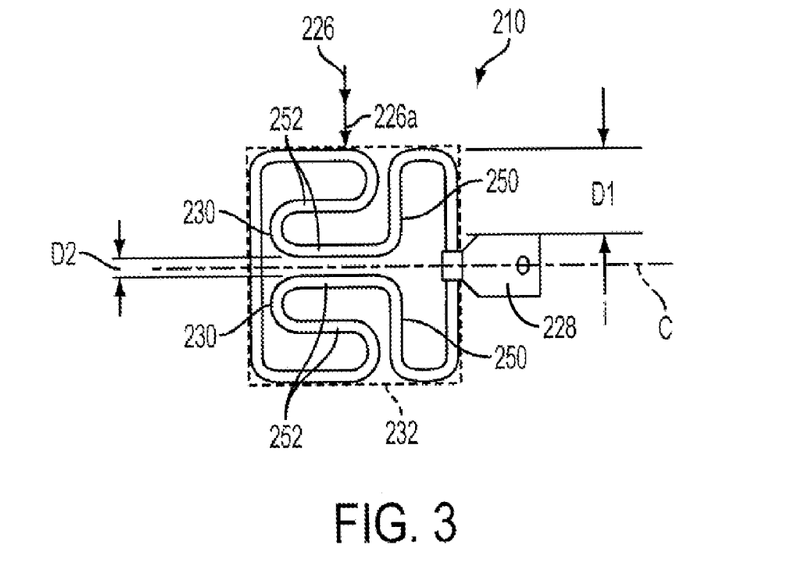
FIG. 3 is a plan view of a third exemplary embodiment of an attachment assembly for securing a child safety seat to a vehicle.

FIG. 3 is a plan view of a third embodiment of an exemplary attachment assembly. Attachment assembly 210 may include a deformable structure 226 and a vehicle mounting portion or a tab 228. Typically, the perimeter 232 is a rectilinear perimeter drawn from the corners of the base and distal ends, as shown in dashed lines in FIG. 3.

In this embodiment, the sinuous deformable portions 230 do not cross each other, but rather extend inwardly from the perimeter of the deformable structure to include portions that are positioned adjacent each other on opposite sides of the longitudinal axis C of the deformable structure. In the depicted embodiment, sinuous deformable portions 230 include lateral segments 250 curvedly connected to longitudinal segments 252. The longitudinal segments 252 and lateral segments 250 are formed substantially parallel to and spaced apart from each other.

Further, in the embodiment depicted in FIG. 3, the segments extending inwardly from the perimeter 232 may include an S-shape by viewing from one side of the central longitudinal axis C. The S-shape may include three straight segments substantially parallel to the center line and two curved segments.

Alternatively, sinuous deformable portions 230 are typically symmetric about the central longitudinal axis C. In one example, sinuous deformable portions 230 may be defined by distances between longitudinal segments 252, D1 and D2. D1 may be the shortest distance from a longitudinal segment adjacent to the central longitudinal axis C to perimeter 232. D2 may be the shortest distance between longitudinal segments 252 adjacent to and opposite to the central longitudinal axis C. In some embodiments, such as the embodiment illustrated in FIG. 3, D2 is less than D1.

In one embodiment, perimeter of the deformable structure may be designed to fit within a predefined area, for example a square of approximately 80×80 mm. It should be appreciated that the deformable structure may be fit into other area of suitable size. For upper anchorage installations, the diameter of the metal wire or rod may range from about 5 mm to 7 mm. For lower anchorage installations, the diameter of the metal wire or rod of the child safety seat may be about 6+/−0.1 mm. However, it should be appreciated that other suitable diameters may be used. While in some embodiments, a metal wire or rod is used, alternatively another fabrication of metal may be used, such as machined, cast, forged, or stamped metal may be used. Further, cross-sections other than circular may be employed, such as rectangular, square or semi-circular.

The attachment assemblies described above have various advantages. For example, when the attachment assembly is used as in the upper anchorage, the deformable structure or the energy absorbing structure incorporated into the attachment assembly may dissipate the loads applied to the child safety seat in a controlled manner, thereby reducing forces on the top tether. Further, the configurations of the deformable portions can be easily varied based on the desired load because the central region provides more space to accommodate sufficient deformable portions for the load. For example, the length of the sinuous portions, the shape of the inward segments, number of rings and/or the distance between the rings may be varied to obtain desired deformation under certain forces.

Further, the coupling between the deformable structure and the tab provides adjustment to the applied forces. For example, the rotational and lateral movements of the deformable structure relative to the tab may adjust so that the direction of deformation of the deformable structure is substantially aligned with an impact force so that impact energy can be effectively absorbed.

Furthermore, the attachment assembly may be formed of one piece and easy to manufacture. Additionally, because of the compact and substantial planar configuration, the attachment assembly may be at least partially hidden from view of the customers if desired, which improves the aesthetic appearance.

Figure 4:
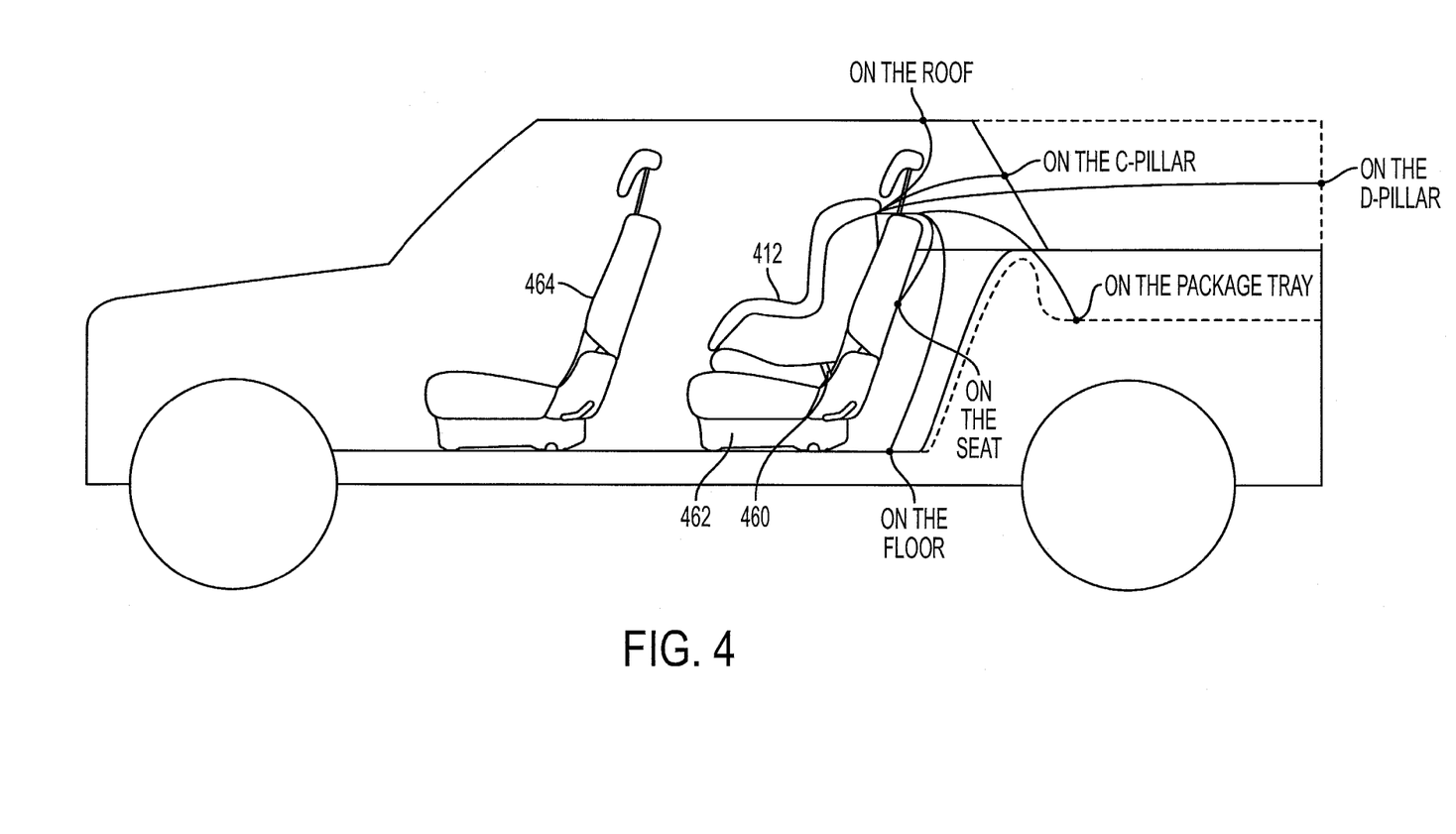
FIG. 4 is a cross-sectional view of a vehicle, schematically illustrating mounting portions in the vehicle to secure an attachment assembly which forms an upper anchorage and a lower anchorage for a child safety seat.

FIG. 4 is a cross-sectional view of a vehicle having a driver seat 464, passenger seat 462, and child seat 412, schematically illustrating mounting portions of a vehicle chassis to which attachment assembly 10 may be secured when used as an upper anchorage or a lower anchorage for a child safety seat 412. As described above with reference to FIG. 1, attachment assembly 10 and mounting portion 16 may be used as an upper anchorage for an upper tether of child safety seat 12. The upper anchorage may be mounted at various portion of the vehicle. As shown in FIG. 4, the attachment assembly for the upper anchorage may be mounted on the package tray, roof, seat, floor, or C-pillar of a sedan type vehicle. The attachment assembly for the upper anchorage may be further mounted on the D-pillar of a wagon as indicated by vertical dash line in FIG. 4. Further, it will be appreciated that attachment assembly may be coupled to a lower end of child safety seat 412 and the mounting portion may be positioned in a bight 460, thereby forming a lower anchorage.

Figure 5:
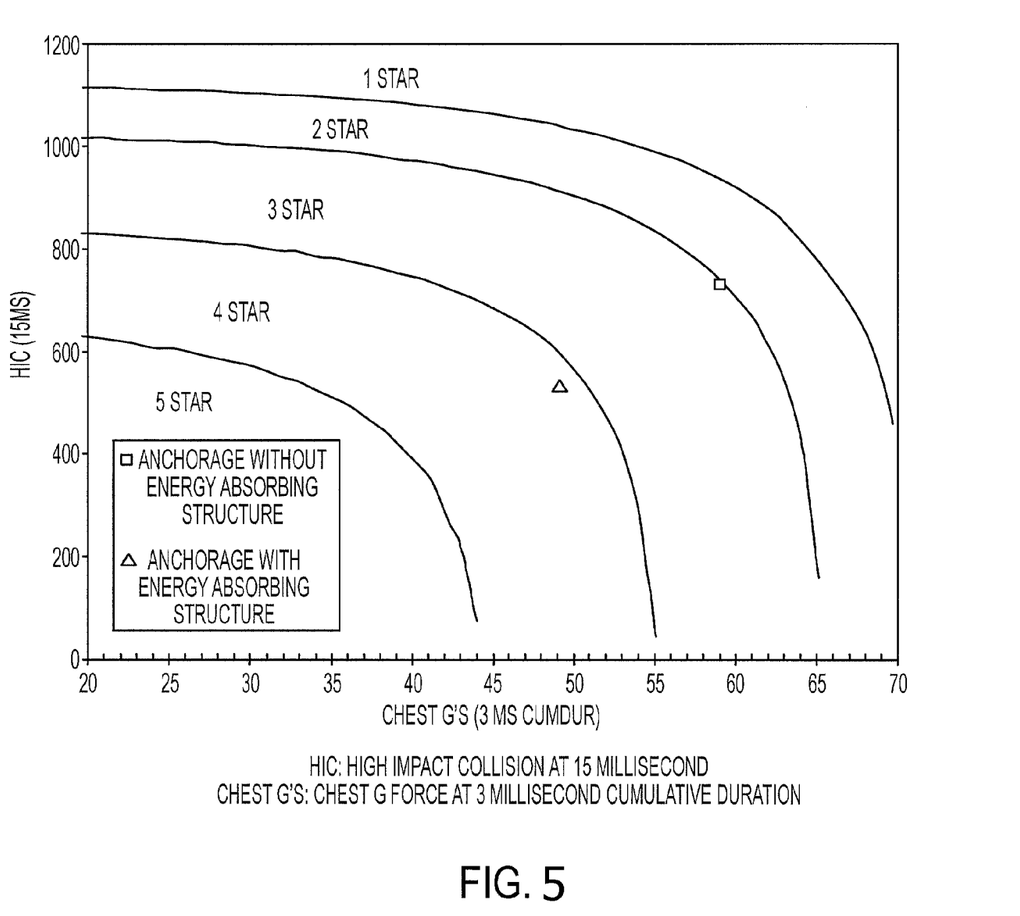
FIG. 5 shows the effect of an attachment assembly with energy absorbing structure in a U.S. New Car Assessment Program (NCAP) 35 mph crash test with a 3 year old Hybrid III dummy in a Child Restraint Seat.

FIG. 5 shows the effect of an attachment assembly with energy absorbing structure in a U.S. New Car Assessment Program (NCAP) 35 mph crash test with a 3 year old Hybrid III dummy in a Child Restraint Seat. Comparing anchorage without an energy absorbing structure, the anchorage having an energy absorbing structure or deformable structure described above shows star rating improvement of more than 1 star. The above results have been shown as examples, as it should be appreciated that different levels of energy absorption and/or reduction in impact force may be achieved.

It will be appreciated that the processes disclosed herein are exemplary in nature, and that these specific embodiments are not to be considered in a limiting sense, because numerous variations are possible. The subject matter of the present disclosure includes all novel and nonobvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An energy-absorbing deformable structure to attach a child safety seat to a mounting portion of a vehicle, comprising:
   a loop of metal rod including:
      a base end configured to be coupled to the mounting portion of the vehicle,
      a distal end configured to be coupled to the child safety seat, and
      a plurality of sinuous deformable portions positioned intermediate to the base end and the distal end, wherein each of the sinuous deformable portions includes an inwardly extending portion that extends inward from a perimeter of the deformable structure to a substantially central interior region of the deformable structure to cross over the central longitudinal axis of the deformable structure;
   wherein the sinuous deformable portions of the deformable structure are configured to be deformed when the base end and distal end are pulled in tension, thereby absorbing energy.

2. The energy-absorbing deformable structure of claim 1, wherein at least two sinuous deformable portions cross over each other.

3. The energy-absorbing deformable structure of claim 2, wherein the crossing sinuous deformable portions separate the loop into a plurality of rings.

4. The energy-absorbing deformable structure of claim 3, wherein the loop crosses itself in two crossing regions, to separate the loop into three rings, including a base ring, intermediate ring, and distal ring, the distal end being formed on the distal ring and the base end being formed on the base ring.

5. The energy-absorbing deformable structure of claim 4, wherein the circumference of the intermediate ring is smaller than the base and distal rings.

6. The energy-absorbing deformable structure of claim 4 wherein the circumference of the base ring is larger than the intermediate and distal rings.

7. An energy-absorbing deformable structure to attach a child safety seat to a mounting portion of a vehicle, comprising:
   a loop of metal rod including:
      a base end configured to be coupled to the mounting portion of the vehicle,
      a distal end configured to be coupled to the child safety seat, and a plurality of sinuous deformable portions positioned intermediate to the base end and the distal end, wherein each of the sinuous deformable portions includes an inwardly extending portion that extends inward from a perimeter of the deformable structure to a substantially central interior region of the deformable structure to a location adjacent a central longitudinal axis of the deformable structure and each of the sinuous portions includes inwardly extending lateral segments curvedly connected to longitudinally extending segments, the longitudinally extending segments being formed substantially parallel to and spaced apart from each other, on opposite sides of the longitudinal axis;
   wherein the sinuous deformable portions of the deformable structure are configured to be deformed when the base end and distal end are pulled in tension, thereby absorbing energy.

8. An energy-absorbing deformable structure to attach a child safety seat to a mounting portion of a vehicle, comprising:
   a loop of metal rod including:
      a base end configured to be coupled to the mounting portion of the vehicle,
      a distal end configured to be coupled to the child safety seat, and
      a plurality of sinuous deformable portions positioned intermediate to the base end and the distal end, wherein each of the sinuous deformable portions includes an inwardly extending portion that extends inward from a perimeter of the deformable structure to a substantially central interior region of the deformable structure, respective sinuous deformable portions being positioned on opposite sides of the deformable structure, and an inner lateral spacing between the oppositely positioned sinuous deformable portions being less than the width of each sinuous deformable portions;
   wherein the sinuous deformable portions of the deformable structure are configured to be deformed when the base end and distal end are pulled in tension, thereby absorbinig energy.

9. An attachment assembly for securing a child safety seat to a vehicle, the attachment assembly comprising:
   a tab coupled to a vehicle mounting portion on a chassis of the vehicle; and
   a deformable structure rotatably hinged to the tab, the deformable structure being formed of a loop of metal rod, wherein the loop includes a base end configured to be coupled to the vehicle mounting portion, a distal end configured to be coupled to the child safety seat, and sinuous deformable portions positioned intermediate the base end and the distal end and extending into a substantially central interior region of the deformable structure, wherein the sinuous deformable portions of the deformable structure are configured to be deformed when the base end and distal end are pulled in tension, thereby absorbing energy.

10. The attachment assembly of claim 9, wherein the tab is coupled to the loop by a coupling portion that includes a loop receiving opening which provides for lateral and rotational movements of the loop relative to the tab.

11. The attachment assembly of claim 9, wherein the distal end of the loop is coupled to an upper end of the child safety seat, to thereby form an upper anchorage.

12. The attachment assembly of claim 11, wherein the vehicle mounting portion is located on one of the C-pillar and the D-pillar of the vehicle.

13. The attachment assembly of claim 11, wherein the vehicle mounting portion is located on a roof of the vehicle.

14. The attachment assembly of claim 11, wherein the vehicle mounting portion is located on a package tray of the vehicle.

15. The attachment assembly of claim 11, wherein the vehicle mounting portion is located on a seat of the vehicle.

16. The attachment assembly of claim 11, wherein the vehicle mounting portion is located on a seat frame of the vehicle.

17. The attachment assembly of claim 11, wherein the vehicle mounting portion is located on a floor of the vehicle.

18. The attachment assembly of claim 9, wherein the distal end of the loop is couple to a lower end of the child safety seat and the base end of the loop is coupled to a vehicle mounting portion positioned in a bight of a seat of the vehicle, thereby forming a lower anchorage.

* * * * *